United States Patent [19]
Friedrichsen et al.

[11] 3,909,457
[45] Sept. 30, 1975

[54] SUPPORTED CATALYST FOR THE OXIDATION OF O-XYLENE OR NAPHTHALENE INTO PHTHALIC ANHYDRIDE

[75] Inventors: Wilhelm Friedrichsen, Ludwigshafen; Otto Goehre, Wilhelmsfeld, both of Germany

[73] Assignee: BASF Aktiengesellschaft, Ludwigshafen (Rhine), Germany

[22] Filed: Dec. 6, 1973

[21] Appl. No.: 422,569

[30] Foreign Application Priority Data
Dec. 12, 1972 Germany............................ 2260615

[52] U.S. Cl. .............. 252/476; 252/461; 260/346.4
[51] Int. Cl.² ......................................... B01J 23/04
[58] Field of Search ......... 252/461, 476; 260/346.4

[56] References Cited
UNITED STATES PATENTS

| | | |
|---|---|---|
| 3,215,644 | 11/1965 | Kakinoki et al. ............... 252/461 X |
| 3,565,829 | 2/1971 | Friedrichsen et al. ........... 252/461 X |
| 3,565,919 | 2/1971 | Friedrichsen et al. ........... 252/461 X |
| 3,684,741 | 8/1972 | Friedrichsen et al. ........ 260/346.4 X |
| 3,692,699 | 9/1972 | Hojo et al. .................... 260/346.4 X |

FOREIGN PATENTS OR APPLICATIONS
1,201,327   9/1965   Germany ........................... 252/461

*Primary Examiner*—W. J. Shine
*Attorney, Agent, or Firm*—Johnston, Keil, Thompson & Shurtleff

[57] ABSTRACT

A supported catalyst for the oxidation of o-xylene or naphthalene into phthalic anhydride which contains in the catalytically active material (in addition to from 1 to 40% by weight of $V_2O_5$ and from 60 to 99% by weight of anatase) from 0.01 to 0.15% by weight, based on the anatase, of sodium or potassium in the form of a compound devoid of sulfur.

4 Claims, No Drawings

SUPPORTED CATALYST FOR THE OXIDATION OF O-XYLENE OR NAPHTHALENE INTO PHTHALIC ANHYDRIDE

This invention relates to a novel supported catalyst for the oxidation of o-xylene or naphthalene into phthalic anhydride.

German Laid-Open Specifications (DOS) Nos. 1,442,590 and 1,643,697 disclose supported catalysts which consist of a nonporous carrier material and an active material applied thereto in a thin layer and containing essentially vanadium pentoxide and titanium dioxide. These catalysts which are suitable for the production of phthalic anhydride by air oxidation of o-xylene or naphthalene have contents based on the active material of for example from 1 to 30% by weight of vanadium pentoxide, from 99 to 70% by weight of titanium dioxide and (based on the supported catalyst) from 0.05 to 3% by weight of vanadium pentoxide.

It has been found that surprisingly these catalysts when they are devoid of alkali metal compounds in the catalytically active material display a very high activity in the catalytic oxidation of o-xylene in a tubular reactor even at fairly low bath temperatures. The strong activity is evidenced by the fact there develops in the catalyst packing of the tube a hot spot of very limited extent and a temperature of more than 500°C. There is therefore the risk of partial decomposition of the hydrocarbon to maleic acid and oxides of the hydrocarbon resulting in a decrease in the yield and quality of the phthalic anhydride. Since this hot spot is too high the bath temperature has to be decreased and a drop in temperature of only 20°C may cause cessation of the reaction.

When alkali metal compounds are added to these catalysts or use is made in the production of a commercially available type of anatase (which contains 0.2% by weight or more of an alkali metal in the form of the oxide to avoid conversion into rutile) the oxidation of crude hydrocarbons, which always contain sulfur, results in the formation of alkali metal sulfates or pyrosulfates which not only impair the catalytic effect but also form melts with the vanadium pentoxide so that some of the vanadium pentoxide is removed from the catalyst. Moreover inactivation of the vanadium pentoxide takes place.

We have now found that a supported catalyst which is suitable for the oxidation of o-xylene or naphthalene into phthalic anhydride and which comprises an inert nonporous carrier which has applied to it a thin layer of activated material containing from 1 to 40% by weight of vanadium pentoxide and from 60 to 99% by weight of anatase and having a vanadium pentoxide content of from 0.05 to 4% by weight based on the supported catalyst does not have the said disadvantages when the catalytically active material contains sodium or potassium in the form of a compound thereof which is devoid of sulfur in an amount of from 0.01 to 0.15% by weight based on anatase.

The new catalysts advantageously contain sintered or fused silicates, porcelain, aluminas, silicon carbide, rutile or quartz as the inert nonporous material. The carrier advantageously has the shape of a sphere having a diameter of from 4 to 12 mm.

The catalytic material applied to the carrier advantageously has a layer thickness of for example from 0.04 to 0.2 mm. The active material advantageously accounts for about 3 to 10% by weight of the supported catalyst.

The anatase advantageously has an internal surface area of from 8 to 15 $m^2$ per gram and a particle size of less than 1 micron, for example from 0.4 to 0.8 micron. The catalytically active material contains from 0.01 to 0.15% and preferably from 0.01 to 0.1% by weight of sodium or potassium based on the anatase. Catalysts which contain potassium are of particular industrial interest. The said alkali metals are added to the catalytically active material in the form of compounds devoid of sulfur, for example in the form of their oxides or other oxygen-containing compounds such as carbonates or acetates in the production of the catalysts.

In addition to the said constituents the active material may contain from 0.1 to 3% by weight and particularly from 0.2 to 1% by weight of phosphorus in the form of a compound and preferably in the form of phosphoric acid or a nitrogenous compound thereof such as an ammonium salt and/or from 0.1 to 15% by weight of a compound and conveniently an oxide of aluminum, zirconium, antimony, arsenic, niobium, chromium, molybdenum, tungsten, cobalt or nickel.

The catalysts may be prepared by conventional methods, for example by mixing a vanadium compound which is converted into vanadium pentoxide when heated such as ammonium vanadate or the oxalate, formate, acetate, tartrate or salicylate of vanadium in water or an organic solvent such as formamide, diethylacetamide, ammonium thiocyanate, fused urea or an alcohol with finely divided anatase with the addition of caustic soda solution or caustic potash solution with or without ammonium dihydrogen phosphate and spraying the mixture, which usually has a pasty consistency, onto the carrier which has been preheated to 150° to 450°C, for example in a coating drum. The finely divided anatase may be obtained for example by grinding, advantageously in a colloid mill.

When used for the production of phthalic anhydride the new supported catalysts are placed in a conventional manner for example in a tubular reactor whose tubes have a diameter of from 25 to 40 mm and contacted with the mixture of hydrocarbon and air.

The diameter of the spheres of carrier is conveniently chosen so that it is about one third of the diameter of the tubes. When a tube having an internal width of 25 mm is used, spheres having a diameter of from 7.5 to 8.2 mm are advantageously suitable. The same spheres or those having a diameter which is about one third of the diameter of the tubes may be used in the case of tubes of larger diameter.

In carrying out the oxidation the tubes are surrounded by a salt bath melt having a temperature of from about 360° to 425°C to control the temperature. The hydrocarbon is passed together with air which has previously been advantageously heated to 150° to 300°C through the tubes, the maximum temperature (hot spot) occurring in the first third of the layer of catalyst and not being allowed to exceed 500°C for a long time. The space velocity is generally from about 4,000 to 10,000 liters of air per hour with about 40 g of hydrocarbon for each 1000 liters of air. The maximum internal temperature (hot spot) is controlled with the salt bath temperature.

The following Examples illustrate the invention.

EXAMPLE 1

1200 grams of steatite spheres having a diameter of 7.8 mm are heated at 300°C in a coating drum. The hot spheres are sprayed with a paste of 150 grams of a finely ground alkali-free anatase having an internal surface area of 11 $m^2$ per gram, 19.5 grams of vanadyl oxalate in 75 ml of water, 47 ml of formamide, 105 ml of water and 0.23 gram of potassium hydroxide. The catalytic material thus formed contains 6% of vanadium pentoxide and the remainder is anatase having a content of 0.1% by weight of potassium in the form of potassium oxide.

8,500 liters of air with 340 g of o-xylene (95%) is passed per hour over 600 parts of the said catalyst which is in a tube having a length of 3 meters and an internal width of 25 mm and which is surrounded by a salt bath at a temperature of 390°C. The hot spot in the first third of the catalyst layer is at a temperature of 470°C.

110% by weight of phthalic anhydride is obtained based on pure xylene. After uninterrupted operation for 18 months it is still not necessary to raise the bath temperature to maintain the yield.

EXAMPLE 2

Commercial anatase in a finely ground condition and having an internal surface area of 11 $m^2$ per gram is stirred with five times its weight of water containing 5% of formic acid. The solid is allowed to settle and the supernatant liquid is decanted. The anatase is then stirred with five times its weight of water without any acid and the liquid is decanted after having allowed to solid to settle. This washing is repeated several times.

The anatase is dried. It contains 0.02% by weight of sodium and 0.01% by weight of potassium. 1200 grams of steatite spheres having a diameter of 7.8 mm are heated to 300°C in a coating drum. Spraying means are used to spray the hot spheres with a paste of 150 grams of the above anatase, 30 grams of vanadyl oxalate in 170 ml of water and 50 ml of formamide. The catalytic material thus formed contains 9% of vanadium pentoxide. The finished catalyst has a content of 4% by weight of active material.

5,100 liters of air with 200 g of o-xylene (95%) is passed per hour over the said catalyst which is situated in a tube 3 meters in length and having an inside diameter of 25 mm.

111% by weight of phthalic anhydride is obtained based on pure xylene. There is no change in the operating conditions after one year.

We claim:

1. A supported catalyst for the oxidation of o-xylene or naphthalene into phthalic anhydride comprising an inert nonporous carrier and applied thereto a thin layer of active material which contains from 1 to 40% by weight of vanadium pentoxide and from 60 to 99% by weight of anatase and which has a vanadium pentoxide content of from 0.05 to 4% by weight based on the supported catalyst wherein the catalytically active material contains from 0.01 to 0.15% by weight, based on the anatase, of sodium or potassium oxide devoid of sulfur.

2. A supported catalyst as claimed in claim 1 wherein the catalytically active material contains from 0.01 to 0.1% by weight of potassium oxide based on anatase.

3. A supported catalyst as claimed in claim 1 wherein the active material constitutes from 3 to 10% by weight of the supported catalyst.

4. A supported catalyst as claimed in claim 1 wherein the anatase has an internal surface area of from 8 to 15 $m^2$ per gram.

* * * * *